(90.)

THOMAS A. SKELTON.

No. 122,409.

6 Sheets—Sheet 1.

Street Lamp.

Patented Jan. 2, 1872.

Witnesses
Geo Pitt
H Carpmael

Inventor.
T. A. Skelton

AM. PHOTO-LITHOGRAPHIC CO. N.Y. (OSBORNE'S PROCESS.)

( 90.)

THOMAS A. SKELTON.

No. 122,409.

6 Sheets--Sheet 2.

Street Lamp.

Patented Jan. 2, 1872.

Figure 7:
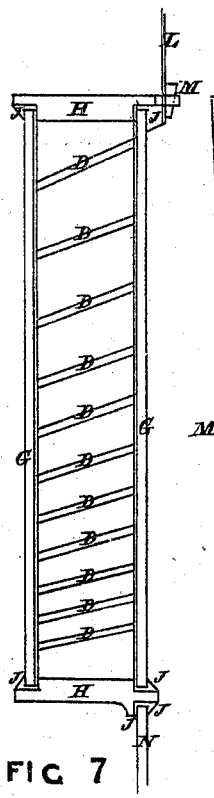
Figure 9:
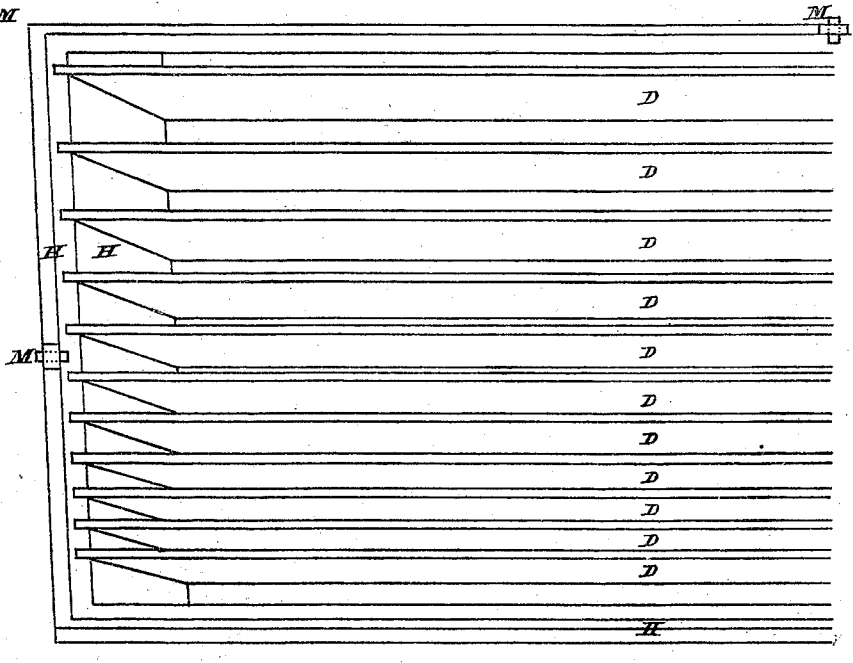
Figure 8:
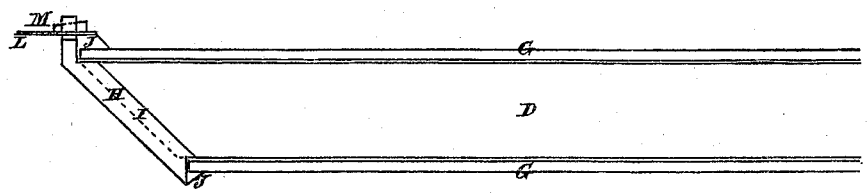

Scale of Figures 7, 8, 9, full size.

Witnesses
Geo. Pitt
D. Carpmael

Inventor.
T. A. Skelton (90.)

THOMAS A. SKELTON.
No. 122,409.

6 Sheets--Sheet 3.
Street Lamp.
Patented Jan. 2, 1872.

Scale full size.

Witnesses
Geo. Pitt
H. Carpenall

Inventor
T. A. Skelton (90.)
THOMAS A. SKELTON.
No. 122,409.

6 Sheets--Sheet 4.
Street Lamp.
Patented Jan. 2, 1872.

Witnesses
Geo. Pitt
J. Carpmael

Inventor
T. A. Skelton (90.)

THOMAS A. SKELTON.
No. 122,409.

6 Sheets--Sheet 5.
Street Lamp.
Patented Jan. 2, 1872.

Witnesses
Geo. Pitt
D. Carpmael

Inventor.
T. A. Skelton (90.)

THOMAS A. SKELTON.
No. 122,409.

6 Sheets--Sheet 6.
Street Lamp.
Patented Jan. 2, 1872.

Scale ¼ actual scale.

Witnesses
Geo. Pitt
D. Carpmall

Inventor.
T. A. Skelton

UNITED STATES PATENT OFFICE.

THOMAS ALFRED SKELTON, OF COUNTY OF MIDDLESEX, ENGLAND.

IMPROVEMENT IN LAMPS FOR STREETS, &c.

Specification forming part of Letters Patent No. 122,409, dated January 2, 1872.

*To all whom it may concern:*

Be it known that I, THOMAS ALFRED SKELTON, of No. 37 Essex street, Strand, in the county of Middlesex, England, a subject of the Queen of Great Britain, have invented or discovered new and useful "improvements in lamps fixed in streets, open spaces, factories, railway stations, and public buildings," and I, the said THOMAS ALFRED SKELTON, do hereby declare the nature of the said invention and in what manner the same is to be performed to be particularly described and ascertained in and by the following statement thereof, that is to say—

This invention consists in the application to certain lamps of reflectors or glass prisms or prismoids, or of a combination of reflectors, prisms, or prismoids, placed horizontally in front of the point of light and at such angles with regard to the point of light according to the well-known laws of the reflection and refraction of light as will intercept and utilize by reflection or refraction certain rays of light otherwise useless by reason either of their vertical elevation or direction and in hermetically or otherwise sufficiently inclosing such reflectors, prisms, or prismoids, between plates of glass both as a protection from dust and moisture, and to economise labor in cleaning. This improvement in lamps is specially applicable to street-lamps, and other such lamps fixed in parks and open spaces and in railway stations, factories, buildings, and places where the rays of light ascending above the level of the lamp are practically useless and wasted.

Having thus described the nature of my said invention, I will now proceed to describe the manner in which I propose to carry the same into effect; and for the purpose of more clearly describing the same I will use the drawing hereunto annexed, in each of the figures of which the same letters of reference indicate similar parts.

I wish, however, it to be understood that I do not confine myself to the precise details shown in the said drawing so long as the distinctive characteristics of my invention are adopted. I wish, however, here to state that my invention is applicable to lamps, such as I have above mentioned, of any form or shape, and to such lamps, whether already constructed and in use, as also, to lamps of which this invention or improvement may hereafter form part of the original construction, and it may, also be applied to one or more sides of any such lamp.

The materials in which this improvement in lamps may be executed are as follows: The reflectors may be of any suitable material having a reflecting surface. Thin "silvered glass" manufactured by a new process and known as "patent silvering," the glass being silvered by a deposit of silver in solution, and not by the "quicksilver process," is preferable, it being a brilliant reflector unaffected by a high temperature, and protected by a red-lead coating on the silvered side. The prisms or prismoids should be of a clear transparent glass, and may be cast in molds of the required form, and "fire-glazed," or "cut" and polished if the greatest effect is required and expense not an object. The inclosing glass plates should be of flatted crown-glass or of the fifteen ounce or twenty-one ounce sheet-glass of the usual glazing quality; and where colored illumination is required either or both of these plates may be colored glass. The frame and fastenings should be of metal, cast or stamped or manufactured of sheet or rolled metal in the ordinary way for similar metal cases to the required form; and if of iron then also tinned or galvanized. The adjusting-screws and appliances should be of metal. The reflectors, prisms, prismoids, and glass plates may be fixed or secured in red lead, putty, or in other similar cement; white-lead and varnish-putty has the advantage of not discoloring.

Figure 1:
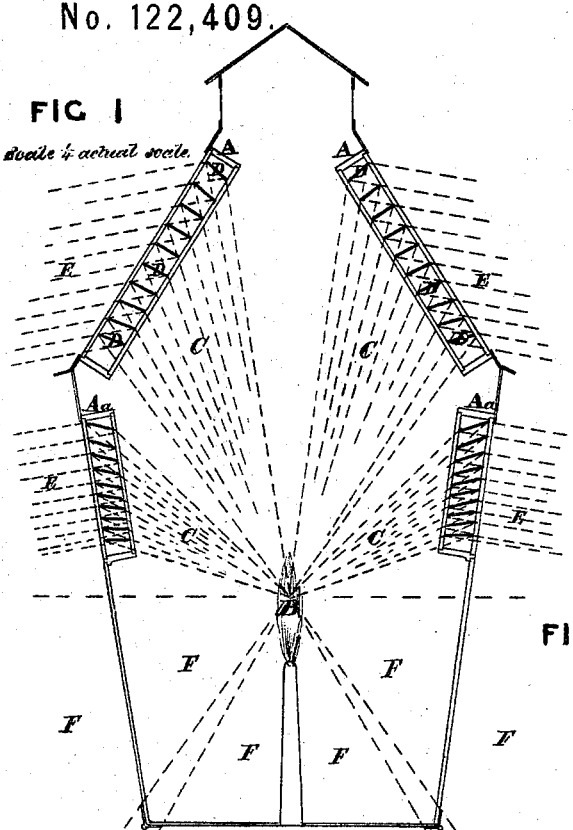
Figure 3:
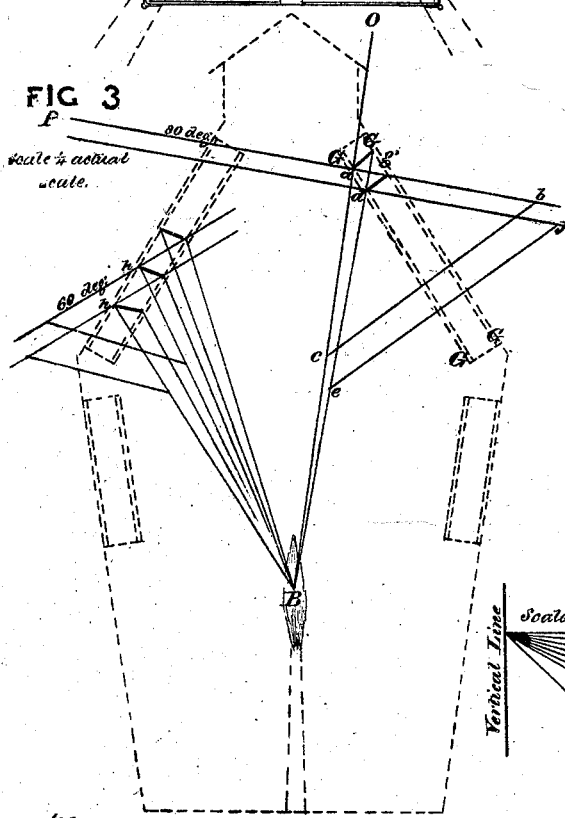
Figure 2:
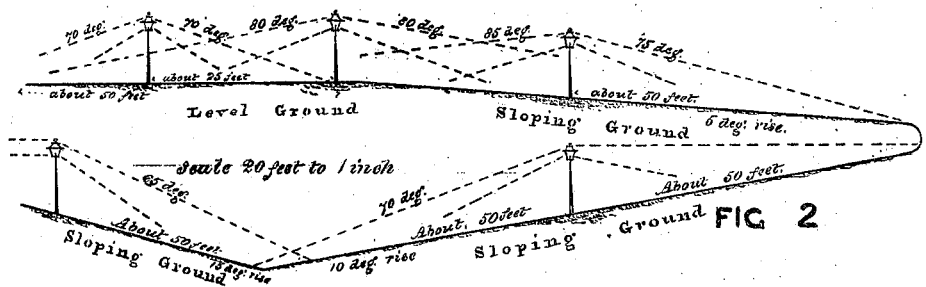
Figure 4:
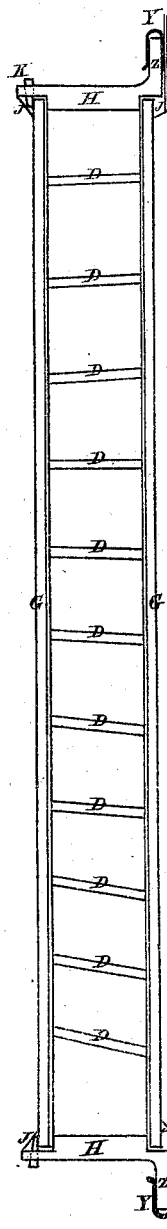

Figure 1 represents the vertical section of an ordinary street-lamp with cases of reflectors constructed according to my invention, taking the place of part of the usual glazing, (which is to be removed so far as the cases extend,) and in this application placed on two sides to reflect the light in the direction of the length of the street. B represents the highest point of light in the flame. C C are the otherwise useless direct rays of light emanating from the flame, which, by this invention, I divert and utilize. D D D are the reflectors intercepting the above-mentioned rays of light C C. E E are the above-mentioned rays of light C C after reflection, by which they have been diverted into a new direction. F F are the useful direct rays of light which are not affected by this invention. In this form of lamp of the usual size it is advisable to let B, the flame or brightest point of light, be about six inches from the bottom of the lamp-frame, so that the under side of the upper case may not be overheated or blackened by the flame. For ordinary steet-lamp purposes and to meet the necessities of various positions requiring the light to be reflected to a greater or less distance, or at greater or less angles, it will be advisable to construct these cases of reflectors upon a scale estimated to reflect at angles either of 65, 70, 75, 80, 85, and 90 degrees, as shown on Fig. 2; and for intermediate or greater or less angles where specially required. In Fig. 2, I have represented a series of street-lamps placed on ground of different degrees of slope for the purposes of illustrating the necessity of varying the angles of the reflectors. These angles must vary with the distance of the lamps apart from each other. A simple method of ascertaining with practically-sufficient accuracy the position in which to fix each separate reflector is described in Fig. 3, in which the outlines of the lamp are represented by dotted lines. B represents the point of light; B O, the line or direction of the highest ray of light intended to be reflected; P Q, the angle at which it is required to reflect the light; G G G G, the position of the intended inclosing glass-plates. Then at $a$, the point of intersection of the lines B O and P Q, set off any equal distance on those lines in the direction of B and Q, and a line drawn through those points, say $c$ and $b$, will be parallel to the required angle of the reflector D which is to be placed in this position. Next draw a line from B to $g$, the outer edge of the reflector, and the point $d$ where that line intersects the inner glass plate will be the position of the inner edge of the next reflector; then set off, as before, equal distances on the line of the ray of light B $d$, and on the angle of reflection required, $d f$; and drawing a line through the points $e f$ place the second reflector parallel to the line $e f$, and proceed as before. For angles of greater inclination downward from the lamp, proceed as indicated at $h h$, Fig. 3. The angle of inclination at which the roof-case A, Fig. 1, should be constructed so as to secure the maximum effect of reflection should approximate to a line at right angles with the plane of the center reflecting surface in the upper or roof-case A, as in Fig. 1. A mode of construction suitable for ordinary street-lamps is explained in detail in sheet No. 3, Fig. 4, representing a vertical section of the upper case A.

Figure 6:
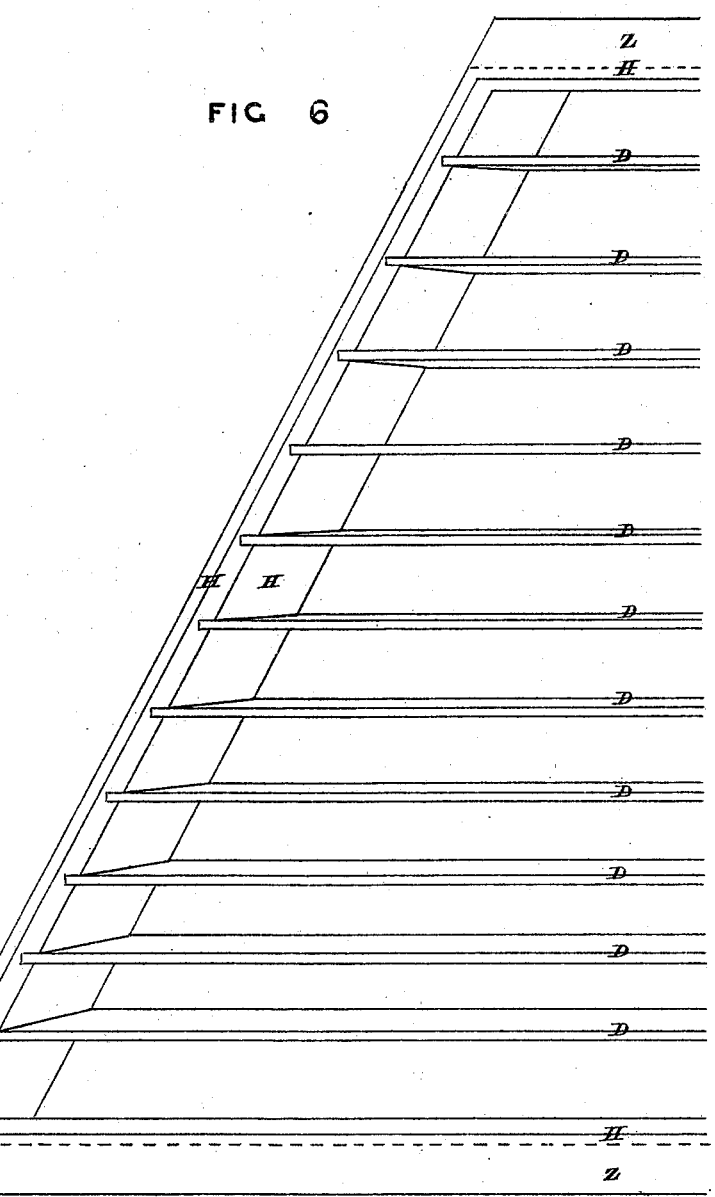
Figure 5:
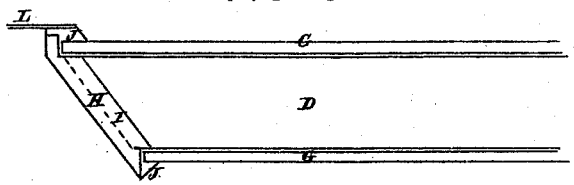

Fig. 5 represents a horizontal longitudinal section of the same, and Fig. 6 a front exterior view or elevation of the same case. Fig. 7 shows a vertical section of the side case A $a$. Fig. 8 represents a horizontal or longitudinal section of the same, and Fig. 9 a front exterior view or elevation of the same case, to all of which figures the following letters and references apply.

Figure 14:
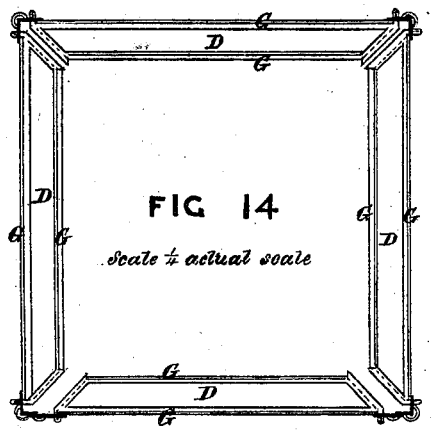
Figure 10:
Figure 11:
Figure 12:
Figure 13:
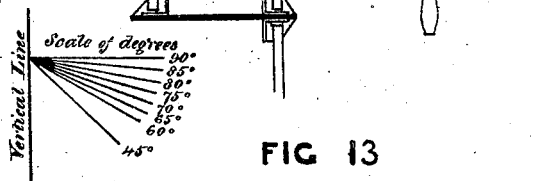

D D D are the reflectors; G G G, the inclosing sheets of glass; H H, the metal frame; I I I I, the grooves in the interior sides of the metal case to receive the ends of the reflectors; J J J J, the joint of red-lead or other suitable material to render the case air-tight and exclude dust or moisture; K K, the pins or screws to secure the sheets of glass in their places; L L, the part of the lamp-frame to which the case may be fixed by clip Y or wedge or pin and loop M, or by screws or other suitable means; M M, the wedge or pin and loop; N, the glass fitted to the lower part of the side of the lamp in the usual way; Y Y, copper clips riveted to lamp-frame and bent over the flange Z of the cases to secure them in position; and Z, flange part of case by which it may be secured to lamp-frame, and which will also allow or compensate for variations in size of lamp-frames. The vertical concentration or dispersion of the rays of light reflected may be accomplished either by arranging each separate reflector to reflect at an angle of inclination varying from the others, or dispersion by forming all the reflectors with surfaces slightly concave, convex, or fluted in a horizontal direction, as shown in Fig. 10, a transverse section of a concave silver-glass reflector; Fig. 11, a transverse section of a convex silvered glass reflector; and Fig. 12 a transverse section of a fluted or corrugated silver-glass reflector; or dispersion may be effected by forming one or both of the inclosing glass plates G of clear fluted glass with the flutings put in a horizontal direction. The horizontal dispersion of the light reflected may be usefully employed where the lamp is required to give light in all directions, as in lamps fixed at cross-roads and in open spaces, and this dispersion may be effected by forming each reflector with a vertically-fluted surface, as in Fig. 13, a longitudinal section of a single silvered glass reflector; and in Fig. 14, a horizontal section through the lamp D, being the fluted reflector; or by forming one or both of the inclosing glass plates G of clear fluted glass, the fluting placed vertically, and by placing the reflectors alternately slightly inclined to the right and left out of the parallel horizontal line.

Figure 28:
Figure 27:
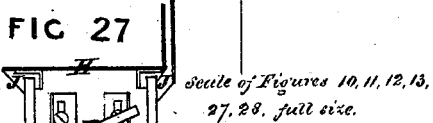

The hereinbefore-contained details, illustrations, and examples of this invention have related exclusively to lamps in which the separate reflectors are fixed and immovable in their respective positions in their several inclosing cases. It may be found useful or necessary to construct lamps in such a manner that each set of reflectors may be, from time to time, capable of adjustment to any required angle, as illustrated at Figs. 27 and 28; and in which it may also be convenient to have the power to vertically concentrate or disperse the rays of reflected light.

Figure 18:
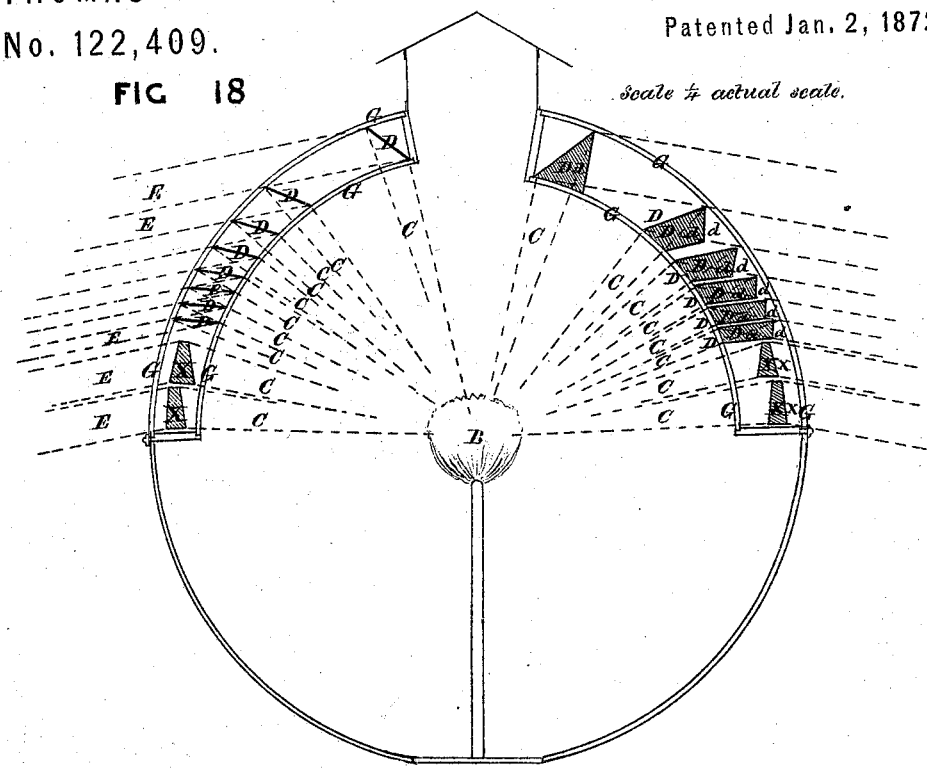
Figure 19:
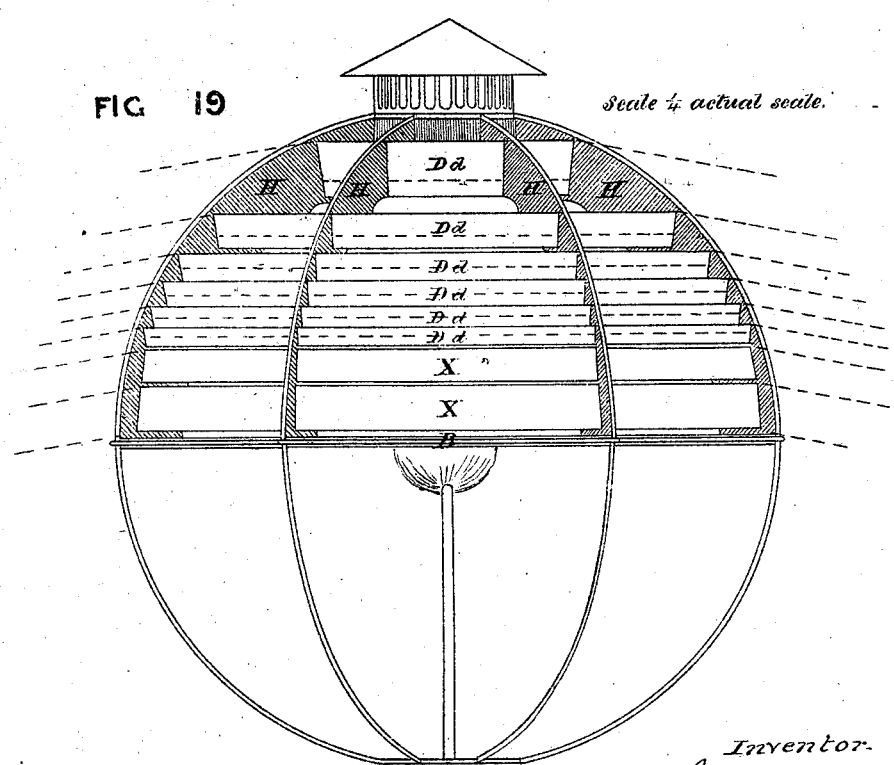
Figure 20:
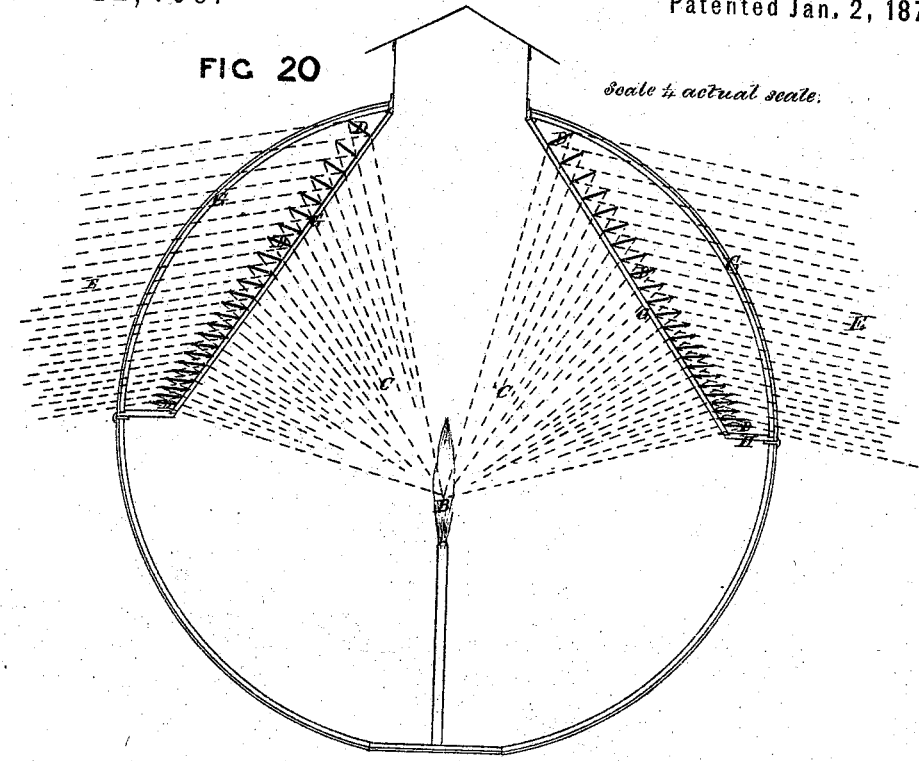
Figure 22:
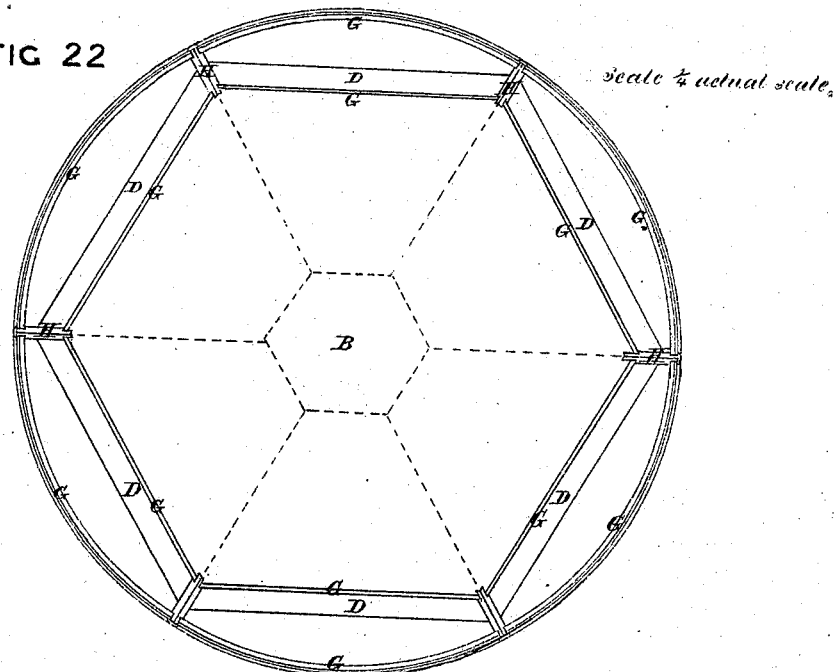
Figure 23:
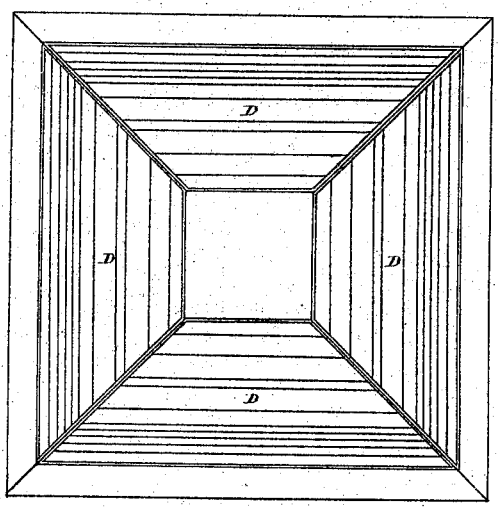
Figure 24:
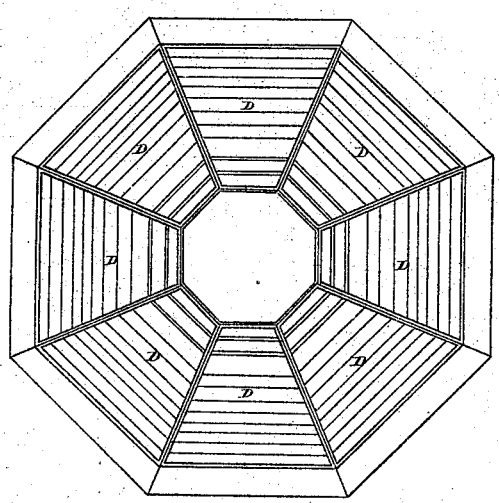
Figure 25:
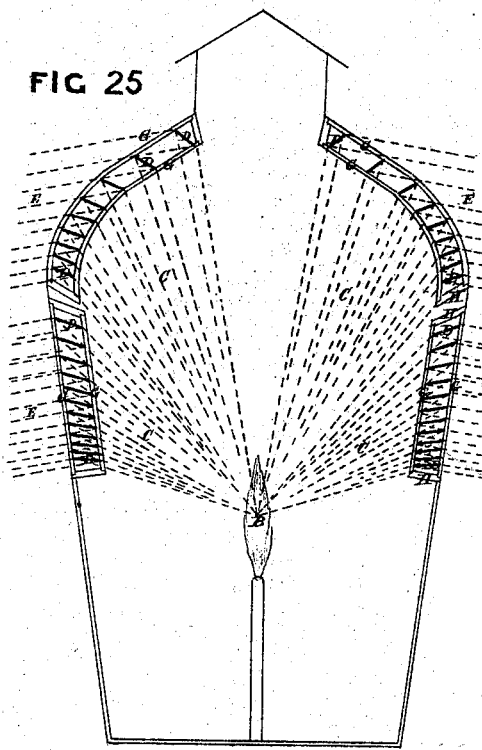
Figure 26:
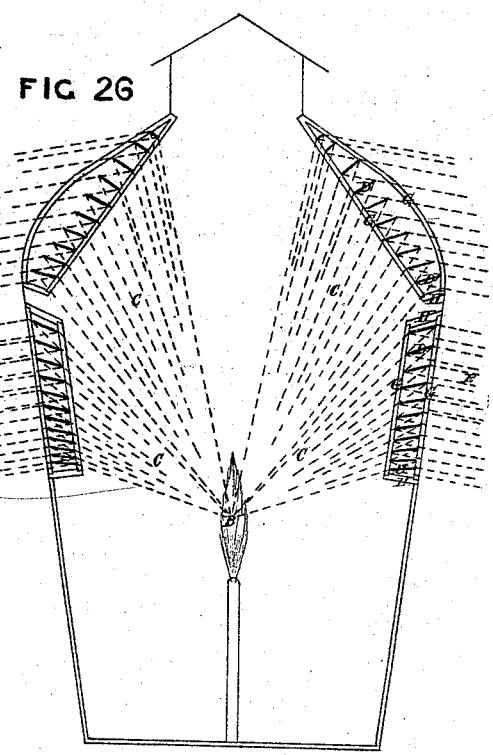

This invention may be applied to lamps whose inclosing sides or tops are globular, circular, or curved in form, by using prisms or prismoids D d and X, or curved metal reflectors D of the required shapes and curves inclosed between curved glasses, as shown in Figs 18 and 19; or by constructing the cases with curved glass on the exterior and flat glass toward the light, as shown in Fig. 20, in which case flat reflectors may be used in the manner hereinbefore described for ordinary street-lamps, as shown in Figs. 20 and 22; as they also may in lamps whose tops are square or angular on plan; but of curved glass in the vertical section, as described in Figs. 23, 24, 25, and 26.

The same or similar mechanical construction of the inclosing cases and fittings will apply to these curved forms of lamps with sockets in the frame H, of a proper form to receive the ends of the prisms or prismoids instead of the grooves applicable to reflectors.

For indoor or factory purposes or other such employment of light, these cases of reflectors may be fitted to utilize the otherwise-wasted rays of light without the necessity for any lamp-casing, it being only necessary to suspend or fix the cases of reflectors above the light in the position for which they are to be constructed.

Prisms or prismoids of glass may be employed in all cases instead of reflectors, if desired, it being necessary to place one side of the prism or prismoid at the same position and angle as the reflecting surface would have occupied as D d, in Fig. 18. A combination of reflectors or prisms or prismoids used to reflect light, and prisms or prismoids placed so as to refract light may be employed where it is desired; also to utilize the rays of light whose direction differs only slightly from the direction in which it is required to divert them, as shown in Fig. 18, where X represents a prism or prismoid diverting the light by refraction, and D d prisms or prismoids diverting light by reflection. An additional saving of light may be effected by causing the surfaces of the metal inclosing cases, the backs of the reflectors and the interior surfaces of the lamp frame-work to be white; these surfaces, being illuminated by the flame, will be reflected at various angles by the reflectors.

To avoid condensation taking place on the inner surfaces of the inclosing glass plates, and so partly obscuring the rays of reflected light, care must be taken that the air inclosed within the sealed cases is perfectly dry, and that the putty or cement used inside is set and hardened, and of such composition that no vapor may be produced from it by the heat to which the case will be subjected when in use. It may also be advisable to place within each case some fragments of quick-lime to absorb and fix any moisture accidently inclosed, or when difficulty is found in artificially drying the air.

And now, having described the nature of the said invention and the manner in which it is to be effected and performed, I declare that what I claim as my invention, is—

The manufacture, application, and use, for the purposes hereinbefore mentioned, of reflectors or glass prisms or prismoids, or of a combination of reflectors, prisms, or prismoids hermetically or otherwise sufficiently inclosed between plates of glass, as hereinbefore described and represented on the several sheets of the drawing hereunto annexed.

T. A. SKELTON.

Witnesses:
 G. F. WARREN,
 WILMER M. HARRIS, (90)
Both of No. 17 Grace-church street, London.